United States Patent Office 3,033,850
Patented May 8, 1962

3,033,850
ION EXCHANGE TREATMENT
Robert H. Sifferd, Joliet, Ill., assignor, by mesne assignments, to Armour and Company, Chicago, Ill., a corporation of Delaware
No Drawing. Filed May 19, 1958, Ser. No. 735,972
3 Claims. (Cl. 260—211.5)

This invention relates to an improved process for selectively separating a mixture of substances by ion exchange treatment, which process is especially applicable to the purification of vitamin $B_{12}$-active substances.

In the treatment of a mixture of substances by ion exchange to obtain separation of at least one active substance from contaminants thereof, a solution of such mixture of substances is contacted with an ion exchange material to obtain adsorption thereon of at least a substantial portion of the active substance, and then eluting at least a portion of active substance from the resulting adsorbate. The ion exchange material employed in this treatment is a macromolecular compound containing organic cation or anion radicals capable of entering into an exchange reaction with cation or anion groups contained in the substances to be treated in the process. However, since the ion exchange material is conventionally an organic polymer of high molecular weight, there is afforded considerable surface available for adsorption phenomena, and consequently it is often difficult to determine whether the substances treated enter into an exchange reaction or whether they are bound to the non-ionic surfaces of the molecule by magnetic forces. In accordance with this treatment, the ion exchange material is insoluble in the solvents employed, and the purification may be carried out in either a batch or column operation. In the batch operation, the solution of substances to be treated is combined with the ion exchange material in a suitable vessel, and, after assuring adequate contact between such substances and the ion exchange material, the resulting adsorbate is separated from the absorbed liquor by, for example, decantation or centrifugation. On the other hand, the column operation, involves disposing a mass of the ion exchange material in the form of a vertical cylinder, then feeding the solution of substances to be treated into the top of such vertical cylinder and obtaining a gravitational flow of the solution through the mass of ion exchange in obtaining adequate contact therebetween, and collecting the resulting effluent at the bottom of the column. In both instances, elution of the active substance and contaminant substances is achieved by a subsequent treatment of the adsorbate with a suitable solvent in either a batch or column operation.

When there is employed in this treatment a dilute solution of the active substance containing a large portion of contaminant substances, a relatively high ratio of ion exchange material to solution is required to achieve adsorption of a substantial portion of the active substance. This is especially true in those instances in which a large portion of the contaminant substances are adsorbed on the ion exchange material to exclude the active substance from ion exchange or surface adsorption sites. The utilization of a high ratio of the ion exchange material to the amount of substances to be treated may be acceptable in the purification of compounds on a laboratory scale, but in the adaptation of such procedures to manufacturing operations these requirements of the ion exchange material become uneconomical and inefficient.

Accordingly, it is an object of this invention to provide an improved ion exchange treatment in which dilute solutions of an active substance containing a large portion of contaminant substances may be processed in large scale operations economically and efficiently. Another object is to provide an ion exchange treatment in which there is obtained an increased capacity of the ion exchange material for an active substance contained in a dilute solution with a large portion of contaminant substances. Other objects and advantages will become apparent as the specification proceeds.

This improved process involves contacting the ion exchange material with a solution containing at least one active substance and contaminants thereof in an amount less than that which will saturate the ion exchange material with the active substance, then selectively eluting from the resulting adsorbate at least a portion of the contaminant substances, alternately continuing to contact the ion exchange material with the solution of active and contaminant substances and selectively eluting at least a portion of such contaminant substances until the ion exchange material has been substantially saturated with the active substance, and then eluting the active substance from the adsorbate. The alternate selective elution of at least a portion of the contaminant substances from the adsorbate serves to reopen ion exchange and surface adsorption sites on the ion exchange material and to make such sites available for additional amounts of the active substance. For the purposes of this invention, the term "adsorption" refers to the phenomena either of ion exchange or surface adsorption, i.e. the active and contaminant substances may be considered as fixed to the ion exchange material by either surface adsorption or ion exchange.

This process can be especially exemplified in connection with the purification of vitamin $B_{12}$-active substances derived commercially from liver tissue and as intracellular or extracellular metabolic products from certain microorganisms. As the starting material for the present process there may be obtained from these vitamin $B_{12}$ sources a crude concentrate of the vitamin $B_{12}$-active substances in the form of a solution containing the vitamin $B_{12}$-active substances and contaminants thereof, for example, an aqueous extract of the source material. However, better results are achieved when the starting material for this process is derived from vitamin $B_{12}$-producing microorganisms, for example, by the methods set forth in Miner and Wolnak Patent No. 2,646,386 and Rickes et al. Patent No. 2,703,302. In the method of the former patent, the vitamin $B_{12}$-active substances are derived from municipal sewage and, since the vitamin $B_{12}$-active substances are obtained intracellularly in the microorganisms in such sewage, the microorganism cells must be disintegrated in order to release the vitamin $B_{12}$-active substances. On the other hand, the method of the latter patent involves the utilization of certain species of vitamin $B_{12}$-producing microorganisms to metabolize vitamin $B_{12}$-active substances and to extrude it extracellularly into the liquid phase of the culture medium. In both of the foregoing methods, the vitamin $B_{12}$-active substances may be obtained as a crude aqueous solution for employment as the starting material for the present process.

The term "vitamin $B_{12}$-active substances" employed herein refers to cobalamin derivatives, such as cyanocobalamin (vitamin $B_{12}$), hydroxycobalamin, sulfitocobalamin, sulfatocobalamin,, chlorocobalamin, etc.

The crude aqueous solution of vitamin $B_{12}$-active substances obtained by any of the foregoing methods may be subjected to purification by the treatment of this invention in a column operation. Accordingly, a mass of cation exchange material such as a carboxylic acid ion exchange resin, e.g. Amberlite IRC-50 or Rohm and Haas XE-97, may be disposed within a vertical cylinder to form an ion exchange bed. The crude aqueous solution of vitamin $B_{12}$-active substances, in an amount less than that which would saturate the ion exchange resin with the vitamin $B_{12}$-active substances is introduced into the top of the vertical cylinder, and a gravitational flow of such solution through the ion exchange bed is obtained. Although the crude aqueous solution of the vitamin $B_{12}$-active substances may be introduced into the ion exchange column at a pH less than about 7.0, better results are obtained with a crude aqueous solution of vitamin $B_{12}$-active substances having a pH of less than about 5.0, and especially desirable results are achieved at a pH of less than about 2.5. Thereafter, a dilute aqueous acid solution is introduced into the top of the vertical cylinder and passed through the ion exchange bed to selectively elute at least a portion of the contaminant substances fixed to the ion exchange resin without substantially eluting the vitamin $B_{12}$. The acid employed in this "washing" step may be, for example, phosphoric, sulfuric or hydrochloric acid, and such acid may be mixed with the water at a concentration equivalent to 0.1 N hydrochloric acid. After the washing step has been completed, there is introduced into the top of the ion exchange column another increment of the crude aqueous solution of vitamin $B_{12}$-active substances, again in an amount less than that which would saturate the ion exchange bed with vitamin $B_{12}$-active substances, and subsequently another portion of the washing solution is introduced into the top of the ion exchange bed to selectively elute a portion of the contaminant substances fixed to the ion exchange resin. The alternate introduction of the crude aqueous solution of vitamin $B_{12}$-active substances and the washing solution is continued until the ion exchange bed has been substantially saturated with vitamin $B_{12}$-active substances. It has been found that from 5 to 10 times the amount of crude aqueous solution of vitamin $B_{12}$-active substances may be treated with a given amount of the ion exchange resin in accordance with the present process as compared with the "single pass" thereof in conventional ion exchange processes.

After the ion exchange bed has been substantially saturated with vitamin $B_{12}$-active substances in accordance with the foregoing process, the vitamin $B_{12}$-active substances may be selectively eluted from the ion exchange resin by introducing into the top of the vertical column an aqueous acid mixture containing a water-miscible polar organic solvent, such as methyl ethyl ketone, and an acid such as those hereinbefore described in an amount equivalent to 0.1 N hydrochloric acid.

The advantages of this invention can be illustrated by the fact that the capacity of XE-97 ion exchange resin for a crude aqueous solution of vitamin $B_{12}$ derived from sewage is in the order of 300 to 400 mcg. per cubic inch in a conventional ion exchange process, while by the present method approximately 1500 to 4000 mcg. of vitamin $B_{12}$ can be fixed by each cubic inch of XE-97 ion exchange resin.

Although the present process has been illustrated in connection with vitamin $B_{12}$-active substances, it will be apparent that the concept thereof is applicable to the separation of any mixture of substances in an ion exchange process and to the purification of a solution of any active substance and contaminants thereof. The increment amount of the solution of active and contaminant substances contacted with the ion exchange material can be readily determined by continuously introducing such solution into the top of the ion exchange column until the active substances commence to "leak" through the bottom of the column in the effluent. The amount introduced into the column at the commencement of leakage will determine the capacity of the ion exchange bed for the active substance. Accordingly, the increment amount of the crude solution will be an amount less than that which saturates the ion exchange bed. It will also be apparent that the increment amount of crude solution may be any amount less than that which will saturate the ion exchange bed, although it is desirable to employ an increment amount of crude solution substantially less than that which will saturate the ion exchange bed in order to avoid the possibility of leakage. In addition, there will be a progressive decrease in the amount of crude solution which will saturate the ion exchange bed as more and more of the active substance is adsorbed thereon, and consequently it may be desirable to employ progressively decreased increment amounts of the crude solution in this process.

This invention can be further illustrated by the following specific example:

*Example I*

A crude aqueous solution of vitamin $B_{12}$ derived from activated sludge according to the process described in Miner and Wolnak Patent No. 2,646,386 was employed as the starting material in the following purification process. This crude aqueous solution contained 5 mcg. of vitamin $B_{12}$ per ml., and such solution was adjusted to pH 1.5 with sulfuric acid.

The ion exchange column was prepared by disposing 0.8 cubic inch of wet Rohm and Haas IRC-50 ion exchange resin in a vertical glass column one-half inch in diameter to form an ion exchange bed four inches in depth.

An increment of the acidified aqueous solution of vitamin $B_{12}$, in the amount of 5 ml., was introduced into the top of the ion exchange column, and, after gravitationally flowing through the ion exchange bed, the spent extract was removed from the bottom thereof. Immediately after the introduction of this first increment of vitamin $B_{12}$ solution, there was introduced into the top of the column an increment of 0.1 N sulfuric acid solution, in the amount of 5 ml. Alternative increments of the aqueous solution of vitamin $B_{12}$ and the sulfuric acid solution were introduced, successively, into the ion exchange column until there had been employed 400 ml. of the crude aqueous solution of vitamin $B_{12}$. No "leak through" of vitamin $B_{12}$ was discernible in the ion exchange column. Thus was demonstrated by the process an adsorption capacity of 2500 mcg. of vitamin $B_{12}$ per cubic inch of ion exchange resin.

*Example II*

The process employed was similar to that of Example I, except that increments of 50 ml. of the crude aqueous solution of vitamin $B_{12}$ were substituted for the 5 ml. increments, and except that 25 ml. increments of the 0.1 N sulfuric acid solution were substituted for the 5 ml. increments. The total volume of the crude aqueous solution introduced into the ion exchange column was 500 ml.

There was obtained by this process adsorption of 3100 mcg. of vitamin $B_{12}$ per cubic inch of the ion exchange resin.

*Example III*

The process employed was similar to that of Example I, except 2 ml. increments of the 0.1 N sulfuric acid solution were substituted for the 5 ml. increments described therein. The total volume of the crude aqueous solution of vitamin $B_{12}$ introduced into the ion exchange column was 500 ml.

There was obtained by this process adsorption of 3100 mcg. of vitamin $B_{12}$ per cubic inch of ion exchange resin.

*Example IV*

The process employed was similar to that of Example I, except as follows:

The ion exchange column consisted of a vertical glass column in which was disposed 24.8 cubic inches of Rohm and Haas IRC-50 ion exchange resin to obtain an ion exchange bed three inches in diameter and three and one-half inches in depth.

The increments of the crude aqueous solution of vitamin $B_{12}$ were one liter in volume instead of the 5 ml. increments described therein.

The increments of 0.1 N sulfuric acid solution were 500 ml. in volume instead of the 5 ml. increments described therein.

The total volume of the crude solution of vitamin $B_{12}$ introduced into the ion exchange column was 15 liters.

There was obtained by this process adsorption of 3000 mcg. of vitamin $B_{12}$ per cubic inch of the ion exchange resin.

While in the foregoing specification various embodiments of this invention have been illustrated in considerable detail for the purpose of illustration, it will be apparent to those skilled in the art that this invention is susceptible to other embodiments and that many of these details can be varied widely without departing from the basic concept and spirit of the invention.

I claim:

1. In a process for selectively separating vitamin $B_{12}$-active substances from contaminants thereof, the steps of contacting a cation exchange material with a solution of vitamin $B_{12}$-active substances and contaminants thereof in an amount less than that with which the cation exchange material is saturated with vitamin $B_{12}$, then contacting the cation exchange material with a solvent in which at least a portion of the contaminant substances are selectively eluted, alternately contacting the cation exchange material with the solution of vitamin $B_{12}$-active substances and contaminants thereof in an amount less than that with which the cation exchange material is saturated with vitamin $B_{12}$-active substances and with the eluting solvent until the cation exchange material has been substantially saturated with vitamin $B_{12}$-active substances, and then eluting the vitamin $B_{12}$-active substances from the cation exchange material.

2. In a process for purifying a crude concentrate of vitamin $B_{12}$-active substances, the steps of contacting a cation exchange material with a crude aqueous solution of vitamin $B_{12}$ and contaminants thereof in an amount less than that with which the cation exchange material is saturated with vitamin $B_{12}$-active substances, contacting the resulting adsorbate with a dilute aqueous acid solution to selectively elute at least a portion of the contaminant substances, alternately contacting the cation exchange material with the crude aqueous concentrate of vitamin $B_{12}$-active substances and contaminants thereof in an amount less than that with which the cation exchange material is saturated with vitamin $B_{12}$-active substances and with the dilute aqueous acid solution until the cation exchange material has been substantially saturated with vitamin $B_{12}$-active substances, and then contacting the adsorbate with a dilute aqueous acid solution containing a water-miscible polar organic solvent to elute the vitamin $B_{12}$-active substances.

3. In a process for purifying a crude concentrate of vitamin $B_{12}$-active substances, the steps of contacting a carboxylic acid ion exchange resin with an aqueous extract of activated sludge containing vitamin $B_{12}$-active substances and contaminants thereof and having a pH of less than 2.5 in an amount less than that with which the ion exchange resin is substantially saturated with vitamin $B_{12}$-active substances, then contacting the resulting adsorbate with an aqueous solution having a pH of less than about 2.5 to selectively elute at least a portion of the contaminant substances, alternately contacting the ion exchange resin with the aqueous extract of vitamin $B_{12}$-active substances and contaminants thereof in an amount less than that with which the ion exchange resin is saturated with vitamin $B_{12}$-active substances and with the aqueous eluting solution until the ion exchange resin has been substantially saturated with vitamin $B_{12}$-active substances, and then contacting said adsorbate with an aqueous solution having a pH of less than about 2.5 and containing a water-miscible polar organic solvent to elute the vitamin $B_{12}$.

References Cited in the file of this patent

UNITED STATES PATENTS

| | | |
|---|---|---|
| 2,702,263 | Shafer et al. | Feb. 15, 1955 |
| 2,830,933 | Bouchard et al. | Apr. 15, 1958 |
| 2,914,524 | Ziegler | Nov. 24, 1959 |

FOREIGN PATENTS

| | | |
|---|---|---|
| 763,608 | Great Britain | Dec. 12, 1956 |